United States Patent
Madasamy

(10) Patent No.: US 9,717,044 B2
(45) Date of Patent: Jul. 25, 2017

(54) METHOD OF SETTING ATTACH ATTEMPT COUNTER VALUE, USER EQUIPMENT USING THE SAME, AND NETWORK CONTROL ENTITY USING THE SAME

(71) Applicant: Acer Incorporated, New Taipei (TW)

(72) Inventor: Sathiyakeerthi Madasamy, New Taipei (TW)

(73) Assignee: Acer Incorporated, New Taipei (TW)

( * ) Notice: Subject to any disclaimer, the term of this patent is extended or adjusted under 35 U.S.C. 154(b) by 461 days.

(21) Appl. No.: 14/228,265

(22) Filed: Mar. 28, 2014

(65) Prior Publication Data

US 2014/0295824 A1    Oct. 2, 2014

Related U.S. Application Data

(60) Provisional application No. 61/805,933, filed on Mar. 28, 2013.

(51) Int. Cl.
| | | |
|---|---|---|
| *H04W 24/00* | (2009.01) | |
| *H04W 48/18* | (2009.01) | |
| *H04W 52/02* | (2009.01) | |
| *H04W 24/04* | (2009.01) | |
| *H04W 8/06* | (2009.01) | |
| *H04W 60/00* | (2009.01) | |

(52) U.S. Cl.
CPC ........... *H04W 48/18* (2013.01); *H04W 24/04* (2013.01); *H04W 52/0216* (2013.01); *H04W 52/0258* (2013.01); *H04W 8/06* (2013.01); *H04W 60/00* (2013.01); *Y02B 60/50* (2013.01)

(58) Field of Classification Search
CPC . H04W 52/0212; H04W 60/04; H04W 60/05; H04W 48/18
See application file for complete search history.

(56) References Cited

U.S. PATENT DOCUMENTS

| | | |
|---|---|---|
| 8,135,404 B2 | 3/2012 | Huang |
| 2010/0081393 A1* | 4/2010 | Huang .................... H04W 4/20 455/68 |
| 2011/0075589 A1 | 3/2011 | Bradley et al. |

(Continued)

FOREIGN PATENT DOCUMENTS

| | | |
|---|---|---|
| CN | 101631338 | 1/2010 |
| CN | 102113302 | 6/2011 |
| CN | 102595637 | 7/2012 |

*Primary Examiner* — Qun Shen
(74) *Attorney, Agent, or Firm* — Jianq Chyun IP Office

(57) ABSTRACT

The present disclosure proposes a method of setting an attach attempt counter value by a network applicable under the circumstance when a UE attempts to attach to a network control entity of the network. The proposed method would include the UE transmitting an attach request message to a network. After transmitting the attach request message, the UE may receive an attach reject message in response to an attach failure. The attach reject message would contain an attach attempt counter value set by the network so as to generate a received attach attempt counter value which would overwrite whatever value that was currently stored in the attach attempt counter. The UE could then determine whether to continue attempting to attach to the network according to the attach attempt counter value received from the attach reject message.

20 Claims, 3 Drawing Sheets

(56) References Cited

U.S. PATENT DOCUMENTS

| | | | | |
|---|---|---|---|---|
| 2012/0014354 A1* | 1/2012 | Dwyer | ............. | H04W 36/0022 |
| | | | | 370/331 |
| 2012/0028640 A1* | 2/2012 | Guo | ................. | H04L 29/12207 |
| | | | | 455/435.1 |
| 2012/0178449 A1* | 7/2012 | Liao | ..................... | H04W 60/00 |
| | | | | 455/435.2 |
| 2014/0153408 A1* | 6/2014 | Jun | ..................... | H04L 65/1066 |
| | | | | 370/250 |
| 2014/0355417 A1* | 12/2014 | Kim | ..................... | H04W 24/04 |
| | | | | 370/221 |

\* cited by examiner

METHOD OF SETTING ATTACH ATTEMPT COUNTER VALUE, USER EQUIPMENT USING THE SAME, AND NETWORK CONTROL ENTITY USING THE SAME

CROSS REFERENCE TO RELATED APPLICATION

This application claims the priority benefit of U.S. provisional application Ser. No. 61/805,933 filed on Mar. 28, 2013. The entirety of the above-mentioned patent application is hereby incorporated by reference herein and made a part of specification.

TECHNICAL FIELD

The present disclosure directs to a method of setting an attach attempt counter value, a user equipment using the same, and a network control entity using the same.

BACKGROUND

An EPS Mobility Management (EMM) attach procedure is typically used for a user equipment (UE) to attach to an Evolved Packet Core Network (EPC) for packet services in Evolved Packet System (EPS). With a successful attach procedure, a context is established for a UE in an Mobility Management entity (MME), and a default bearer would be established between the UE and a Packet Data Network Gateway (PDN GW) and thus enabling an always-on IP connectivity to the UE.

An attach attempt counter would be used to limit the number of subsequently rejected attach attempts. For a long term evolution (LTE) communication system for example, the attach attempt counter would be incremented as specified in subclause 5.5.1.2.6 of the 3GPP TS 24.301 specification (version v11.4.0 as on September 2012). Depending on the value of the attach attempt counter, specific actions would be performed.

According to the above mentioned specification, the attach attempt counter would be reset under circumstances when the UE is powered on, a USIM is inserted, an attach or combined attach procedure is successfully completed, a GPRS attach or combined GPRS attach procedure is successfully completed in A/Gb or Iu mode, a combined attach procedure is completed for EPS services only with cause #2, #16, #17, #18 or #22, an attach or combined attach procedure is rejected with cause #11, #12, #13, #14, #15 or #25, or a network initiated detach procedure is completed with cause #11, #12, #13, #14, #15 or #25. Additionally the attach attempt counter shall be reset when the UE is in substate EMM-DEREGISTERED.ATTEMPTING-TO-ATTACH and when a new tracking area is entered, the timer T3402 has expired, and timer T3346 has started.

The followings will describe how the attach attempt counter would be incremented. Typically, the attach attempt counter would be not used when a UE successfully attaches to a network but would be used to count the number of re-tries under the circumstances when a UE experiences attachment failures to a core network. FIG. 1 illustrates a typical EMM attachment procedure according to a current version of the LTE specification. In step S101, a UE would attach to a network by first transmitting an ATTACH REQUEST message and start the timer T3410. If the attach request is accepted by the network, the MME would send an ATTACH ACCEPT message to the UE and start timer T3450. The MME would then send the ATTACH ACCEPT message together with an ACTIVATE DEFAULT EPS BEARER CONTEXT REQUEST message contained in the EPS Session Management (ESM) message container information element to activate the default bearer as described in subclause 6.4.1. A network may also initiate the activation of dedicated bearers towards the UE by invoking the dedicated EPS bearer context activation procedure as described in subclause 6.4.2. Upon receiving the ATTACH ACCEPT message, the UE would stop timer T3410.

If the attach request cannot be accepted by the network, in step S102, the MME would send an ATTACH REJECT message to the UE including an appropriate EMM cause value. If the attach procedure fails due to a default EPS bearer setup failure, an ESM procedure failure, or operator determined barring is applied on default EPS bearer context activation during attach procedure, the MME shall combine the ATTACH REJECT message with a PDN CONNECTIVITY REJECT message contained in the ESM message container information element. In this case the EMM cause value in the ATTACH REJECT message would be set to #19 "ESM failure".

Upon receiving the ATTACH REJECT message, in step S103, the UE would stop the timer T3410 and determined the received EMM cause value in order to determine a proper action based on the EMM cause value. At this point, the UE may take actions based on various EMM cause values as indicated in clause 5.5.1.2.5 as in step S104. For abnormal causes as specified in 5.5.1.2.6, the UE may subsequently increment the attach attempt counter.

For example, under the circumstance such as case (d) in subclause 5.5.1.2.6 as in step S105, after ATTACH REJECT has been received by the UE for EMM cause values other than those mentioned in subclause 5.5.1.2.5 and cases of EMM cause #22 if considered as abnormally cases according to subclause 5.5.1.2.5, upon reception of the EMM cause #19 "ESM failure", if the UE is not configured for NAS signalling low priority, the UE may set the attach attempt counter to 5. Upon reception of the EMM causes #95, #96, #97, #99 and #111 the UE would set the attach attempt counter to 5.

Therefore in step S106, a UE would increment the attach attempt counter when it fails to attach to the MME under the circumstance as described in subclause 5.5.1.2.6. This means that for some reject causes such as network error, the device would not only fail to attach but also fail for 5 times as the attempt counter default value is set to five. This means that even though the network would take some time to recover from an error, a UE would nevertheless still try to attach to a MME and send an attachment request five times. This would cost unnecessary signaling and power consumption. Therefore, a method for setting the attach attempt counter value by the network would need to be proposed.

SUMMARY OF THE DISCLOSURE

Accordingly, the present disclosure is directed to a method of setting an attach attempt counter value by a network applicable under the circumstance when a UE attempts to attach to a network control entity of the network.

The present disclosure proposes a method of setting an attach attempt counter value in a user equipment having an attach attempt counter, applicable to a user equipment attempting to attach to a network, and the method would include the UE transmitting an attach request message to a network. After transmitting the attach request message, the UE may receive an attach reject message in response to an attach failure. The attach reject message would contain an attach attempt counter value so as to generate a received attach attempt counter value which would overwrite whatever value that was currently stored in the attach attempt counter. The UE could then determine whether to continue attempting to attach to the network according to the attach attempt counter value received from the attach reject message.

In one of the exemplary embodiments, when the received attach attempt counter value is minimum which is zero or maximum which is five, the user equipment would not transmit another attach request message to the same network until the attach attempt counter is reset.

In one of the exemplary embodiments, when the attach attempt counter value is the minimum value or the maximum value, the user equipment would attempt to attach to another network.

In one of the exemplary embodiments, the attach attempt counter value would not be one value higher or one value lower from the previous value of the attach attempt counter.

In one of the exemplary embodiments, the request attach message is transmitted to a mobility management entity (MME) for a Long Term Evolution (LTE) network.

The present disclosure also proposes a user equipment (UE) which includes at least but not limited to a transmitter and a receiver for transmitting and receiving data respectively, a memory comprising an attach attempt counter, and a processing circuit coupled to the transmitter and the receiver and the memory and is configured for the above mentioned method executed by the UE such as transmitting an attach request message through the transmitter, receiving through the receiver an attach reject message which contains an attach attempt counter value so as to generate a received attach attempt counter value, overwriting the attach attempt counter of the user equipment with the received attach attempt counter value, and determining whether to attach to the network according to the received attach attempt counter value.

The present disclosure proposes a method of setting an attach attempt counter value by a network control entity, applicable to a network control entity attempting to control a number of attach retries of a user equipment, and the method would include at least but not limited to the network control entity receiving an attach request message from a UE. In response to receiving the attach request message, the network control entity would generate an attach attempt counter value in response to the attach request message and also generating an attach reject message which includes the attach attempt counter value in the case when the attach request is to be rejected, and transmitting the attach reject message to the UE.

In one of the exemplary embodiments, wherein generating the attach attempt counter value in response to the attach request message would include generating a maximum value or a minimum value of the attach attempt counter value in response to a network failure.

In one of the exemplary embodiments, wherein generating the attach attempt counter value is dependent on the severity of the network failure such that the attach attempt counter value is generated between the minimum or the maximum value.

In one of the exemplary embodiments, wherein the minimum of the attach attempt counter value is zero and the maximum of the attach attempt counter is five.

In one of the exemplary embodiments, wherein the network control entity is a mobility management entity (MME) for a Long Term Evolution (LTE) network.

The present disclosure also proposes a network control entity which includes at least but not limited to a transmitter and a receiver for transmitting and receiving data respectively and a processing circuit coupled to the transmitter and the receiver and the memory and is configured for the above mentioned steps executed by the network control entity such as receiving through the receiver an attach request message from a UE, generating an attach attempt counter value in response to receiving the attach request message and generating an attach reject message which includes the attach attempt counter value in the case when the attach request is to be rejected, and transmitting through the transmitter the attach reject message to the UE.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
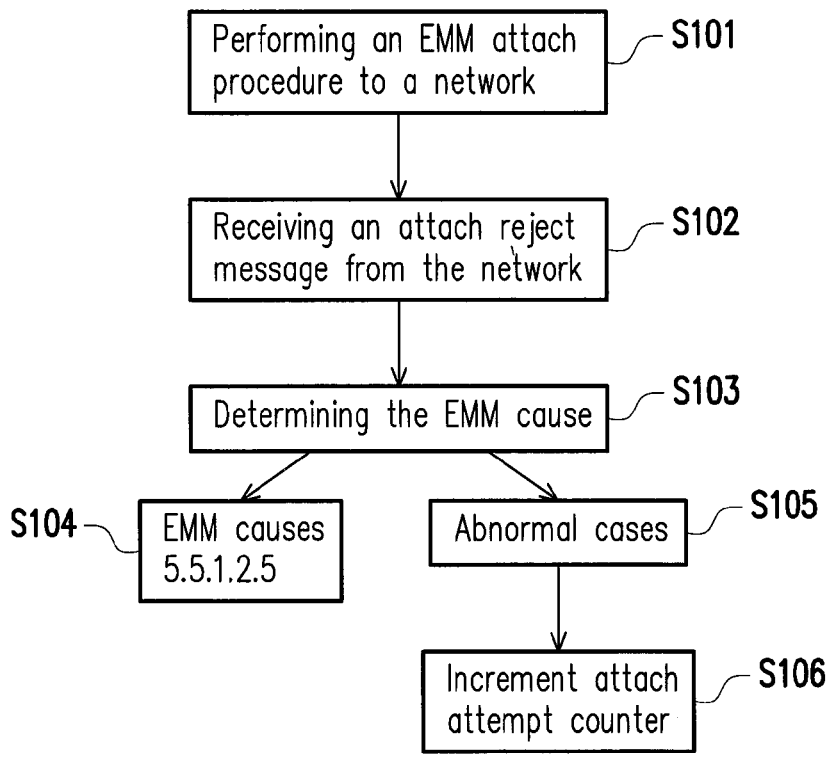
FIG. 1 illustrates a typical EMM attachment procedure according to a current version of the LTE specification.

Reference will now be made in detail to the present preferred embodiments of the disclosure, examples of which are illustrated in the accompanying drawings. Wherever possible, the same reference numbers are used in the drawings and the description to refer to the same or like parts.

Currently, the attach attempt counter is predefined in a UE modem, incremented according to a set rules, and cannot be changed by a network. Even though an attach attempt counter is used to limit the number of rejected attach attempts, a UE would nevertheless try to attach to a network five times which is the attempt counter default value. However, since the source of an attach error may require time by the network to be eliminated and at the same time only a network would know what is happening, it would make more sense for a network to be able to overwrite the value in the attach attempt counter. Under the current scheme, needless power consumption and signaling resource could be wasted. Therefore, the present disclosure proposes a method of setting an attach attempt counter value by a network applicable under the circumstance when a UE attempts to attach to a network control entity of the network.

The proposed method would include the UE transmitting an attach request message to a network. After transmitting the attach request message, the UE may receive an attach reject message in response to an attach failure. The attach reject message would contain an attach attempt counter value set by the network so as to generate a received attach attempt counter value which would overwrite whatever value that was currently stored in the attach attempt counter. The UE could then determine whether to continue attempting to attach to the network according to the attach attempt counter value received from the attach reject message.

Figure 2:
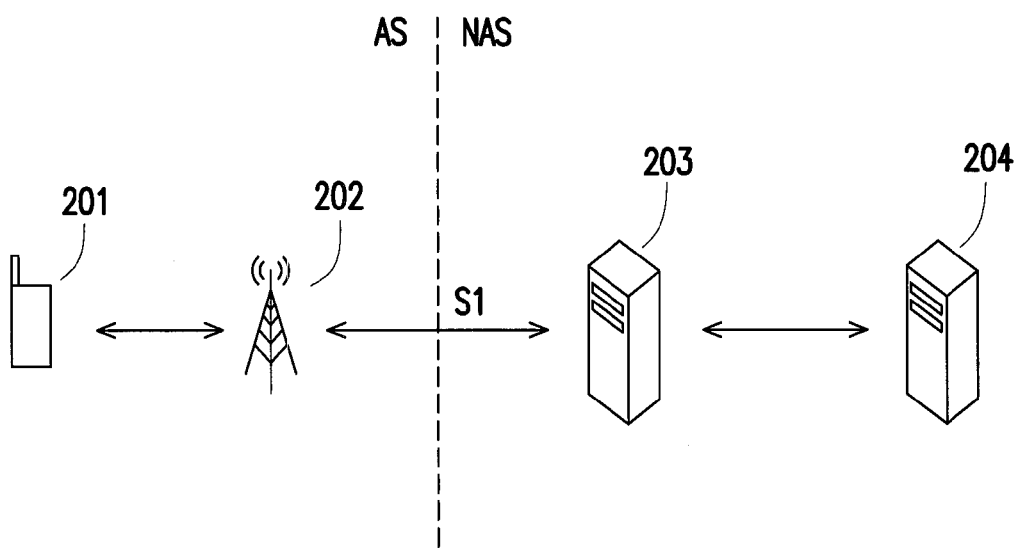
FIG. 2 illustrates an exemplary system architecture in which the proposed method of setting an attach attempt counter value would be applicable.

FIG. 2 illustrates an exemplary system architecture in which the proposed method of setting an attach attempt counter value would be applicable. The quantity of network elements is merely exemplary, is used to provide a context for an ordinary person skill in the art to understand the disclosure, and thus is not meant to be limiting. In the exemplary system architecture of FIG. 2, it illustrates a UE 201 connecting to a base station or an eNB 202 in the case of LTE in the access stratum (AS). The base station or the eNB 202 would be connected to a mobility management entity (MME) 203 in the non-access stratum (NAS) via a backhaul link such as a S1 interface. The MME would generally be connected to some type of charging server 204 and in the present disclosure capable of overwriting the attach attempt counter.

Figure 3:
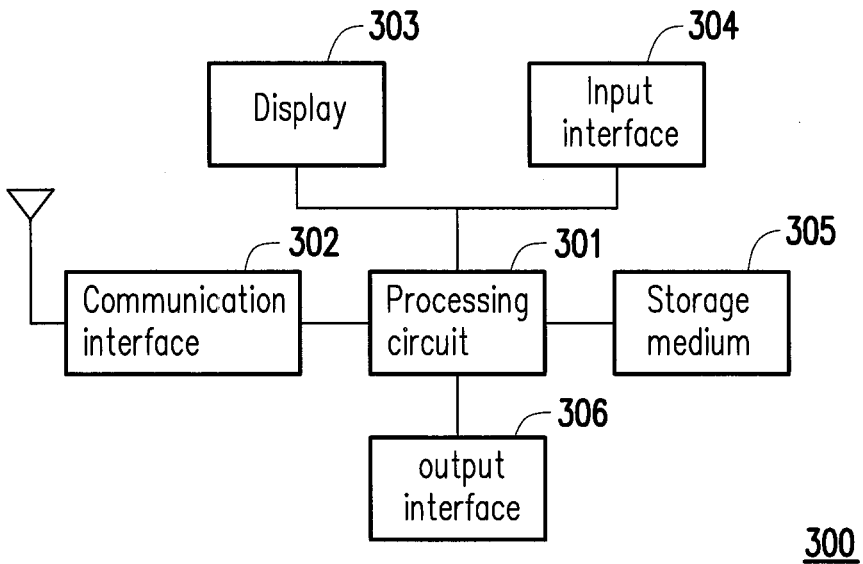
FIG. 3 illustrates an exemplary user equipment which implements the proposed method of setting an attach attempt counter value.
Figure 4:
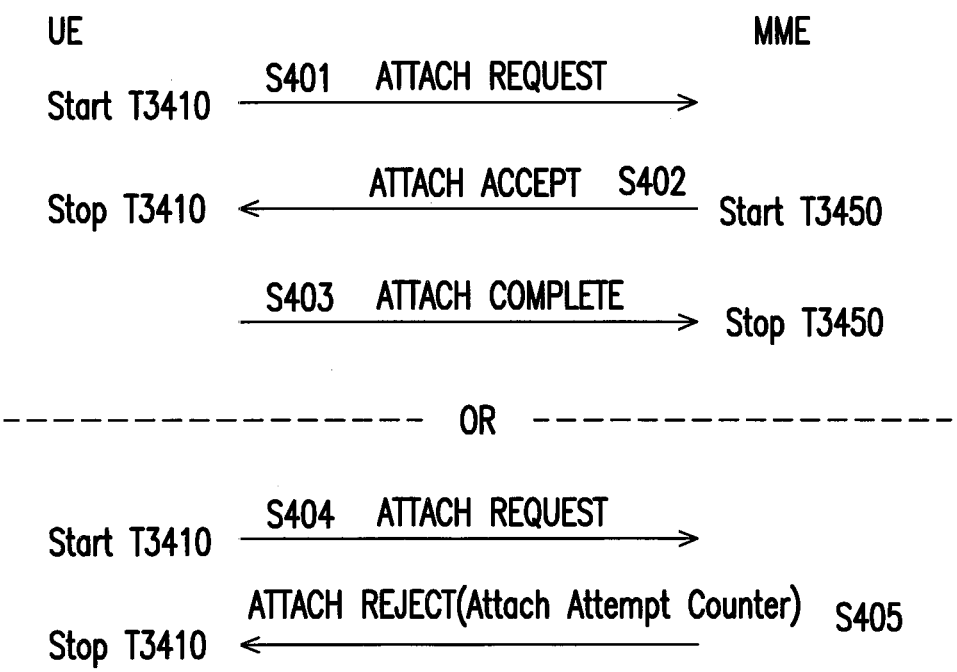
FIG. 4 illustrates a signaling diagram between a user equipment and a mobility management entity in accordance with one of the exemplary embodiments of the present disclosure.
Figure 5:
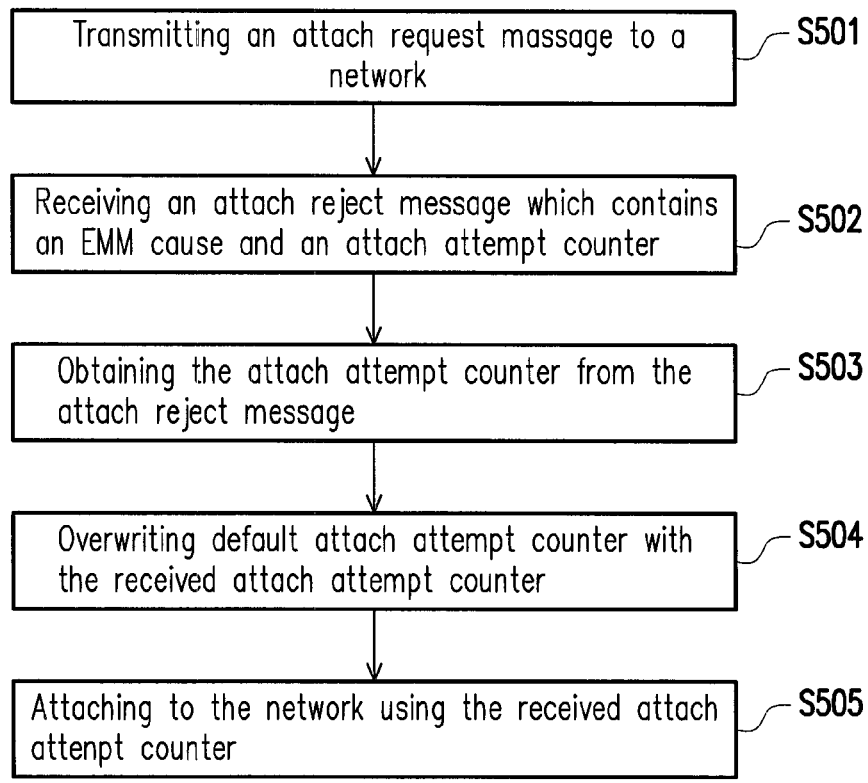
FIG. 5 illustrates the proposed method of setting an attach attempt counter value from the perspective of a user equipment in accordance with one of the exemplary embodiments of the present disclosure.
Figure 6:
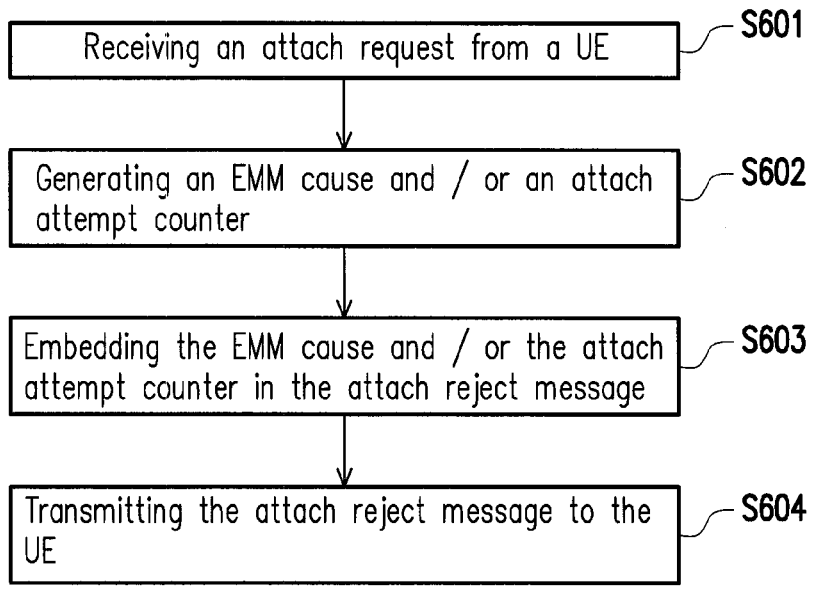
FIG. 6 illustrates the proposed method of setting an attach attempt counter value from the perspective of a network control entity in accordance with one of the exemplary embodiments of the present disclosure.

FIG. 3 illustrates an exemplary user equipment which implements the proposed method of setting an attach attempt counter value. The user equipment 300 would include at least but not limited to a processing circuit or processor 301. The processor would be coupled to a communication interface 302, a display 303, an input interface 304, a storage medium 305, and an output interface 306. The processor 301 may also include a controller. The processor may include a micro-controller, a North Bridge, a South Bridge, a field programmable array (FPGA), a programmable logic device (PLD), an application specific integrated circuit (ASIC), or other similar device, or a combination thereof. The processor 301 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device and would execute functions related to the proposed method as illustrated in FIGS. 4-6 of the present disclosure.

The communication interface 302 could include components such as a protocol unit which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication interface circuit 302 would also provide wireless access for the device 300 by including components at least but not limited to a transmitter circuit and a receiver circuit.

The display 303 could include a touch screen and may contain a display such as a liquid crystal display (LCD), a light-emitting diode (LED) display, a field emission display (FED) or other types of display. The input interface 304 could be, for example, an input device such as a mouse, a keyboard, a joystick, a wheel, and so forth. The storage medium 305 could volatile or permanent memories which would store buffered or permanent data such as the attach attempt counter or compiled programming codes used to execute functions of the exemplary mobile electronic device. The output interface 306 may include a speaker, LEDs, and etc.

A network control entity such as a MME in a communication system may contain at least but not limited to a transceiver circuit, a processing circuit, and a memory circuit. The processing circuit would be coupled to the transceiver circuit and the memory circuit. The transceiver circuit may transmits downlink signals and receives uplink signals through a wired or wireless interface with the rest of core network or with a radio access network over a backhaul link. The processing circuit would be configured to process digital signal and to perform procedures of the proposed method of the present disclosure. Also, the processing circuit may access to a memory circuit which stores data including an attach attempt counter value, programming codes, codebook configurations, buffered data, or record configurations assigned by the processing circuit. The functions of the processing circuit may be implemented using programmable units such as a micro-processor, a micro-controller, a DSP chips, FPGA, etc implemented with separate electronic devices or ICs.

FIG. 4 illustrates a signaling diagram between a user equipment and a mobility management entity in accordance with one of the exemplary embodiments of the present disclosure. Steps S401~403 illustrate the scenario when a UE is able to enter a EMM connective state with a network control entity such as a MME. In step S401, a UE would attempt to establish a connection to a core network by connecting to a network control entity such as a MME and thus would transmit an attach request to the MME and would start the timer T3410. In step S402, the MME would transmit an attach accept signal and start the timer T3450. In response to receiving the attach accept message, the UE would stop the timer T3410 and then in step S403 the UE would transmit an attach complete message to the MME. In response to receiving the attach complete message, the MME would stop the timer T3450.

However, if attach attempt is not successful, then in response to the attach request message in step S404, the MME would transmit an attach reject message in step S405. The attach reject message would include a value for attach attempt counter which would overwrite the attach attempt counter in the UE. For example, upon reading the attach reject message, a UE may read the value in the attach attempt counter which has been determined by the MME depending on the status of the MME. If the MME is encountering a network error, the MME may set the attach attempt counter value to a minimum such as zero or a maximum such as five. Upon reading a zero value for the attach attempt counter, a UE would know that the network is experiencing difficulties and would not attempt to attach to the network or would seek to attach to another network until the attach attempt counter is reset. Upon reading a maximum value for the attach attempt counter, a UE would retreat the situation as the number of re-tries being maxed out. Therefore, by setting the value of attach attempt counter to five immediately, the UE would behave as though the number of re-tries has reached the maximum. The network may also adjust the value of the attach attempt counter based on the severity of the problem currently experienced by the network. For example, if the network could anticipate that the problem would be resolved fairly quickly, a network may adjust the value of the attach attempt counter to 3 or 4 in order to reduce the number of re-tries.

FIG. 5 illustrates the proposed method of setting an attach attempt counter value from the perspective of a user equipment in accordance with one of the exemplary embodiments of the present disclosure. In step S501, a UE would transmit an attach request message to a network. In step S502, a UE would receive an attach reject message which contains an EMM cause and a network written attach attempt counter which would overwrite the value of the attach attempt counter in the UE. In step S503, the UE would obtain the network written attach attempt counter from the attach reject message. In step S504, the UE would overwrite the attach attempt counter with the network written attach attempt counter. In step S505, the UE would determine a next action based on the attach attempt counter received from the network. Upon reading a value zero or maximum such as 5, a UE would stop further attach attempts and may look for another network to attach to until the attach attempt counter has been reset.

FIG. 6 illustrates the proposed method of setting an attach attempt counter value from the perspective of a network control entity in accordance with one of the exemplary embodiments of the present disclosure. In step S601, the network control entity would receive an attach request from a UE. In step S602, the network control entity would reject the attach request by generating an EMM cause and/or an attach attempt counter before issuing the attach reject message to the UE. In step S603, the network control entity would issue the attach reject message to the UE, and the attach reject message would contain the generated EMM cause and/or the attach attempt counter. In step S604, the network control entity would transmit the attach reject message to the UE via a radio access network.

In view of the aforementioned descriptions, the present disclosure is suitable for being used in a wireless communication system and is able to reduce power consumption and signaling resources by reducing the number of re-tries by a UE to attach to a network control entity such as a MME in the case of network attachment failures.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of setting an attach attempt counter value in a user equipment which comprises an attach attempt counter having a first attach attempt counter value, applicable to a user equipment attempting to attach to a network, and the method comprising:
    transmitting an attach request message;
    receiving an attach reject message which contains a second attach counter value in response to transmitting the attach request message;
    overwriting the attach attempt counter of the user equipment with the second attach attempt counter value;
    determining whether to attach to the network according to the attach attempt counter in response to being overwritten with the second attach attempt counter value;
    not transmitting another attach request message in response to the attach attempt counter which has the second attach attempt counter value being 0; and
    transmitting another attach request message in response to the attach attempt counter which has the second attach attempt counter value being greater than zero and less than a maximum number.

2. The method of claim 1 further comprises in response to the attach attempt counter being zero or maximum which is five, the user equipment does not transmit another attach request message to the same network until the attach attempt counter is reset.

3. The method of claim 2, wherein in response to the attach attempt counter value being zero or 5, the user equipment attempts to attach to another network.

4. The method of claim 3 further comprising:
    incrementing the attach attempt counter in response to transmitting the another attach request message.

5. The method of claim 4 further comprising:
    starting a T3410 timer in response to transmitting the attach request message; and
    stopping the T3410 timer in response to receiving attach reject message.

6. A method of setting an attach attempt counter value by a network control entity, applicable to a network control entity attempting to control a number of attach retries of a user equipment, and the method comprising:
    receiving an attach request message;
    generating an overwriting attach attempt counter value for overwriting a current attach attempt counter value in response to a network failure, wherein the attach attempt counter value is between 1 and 4 for limiting a repetition of receiving the attach request message, and the attach attempt counter value is either a minimum number or a maximum number to stop receiving the attach request message;
    generating an attach reject message comprising the overwriting attach attempt counter value and transmitting the attach reject message; and
    transmitting an attach accept message only in response to the network failure being resolved.

7. The method of claim 6 wherein generating the minimum number of the overwriting attach attempt counter value is zero, and the maximum number of the overwriting attach attempt counter value is 5.

8. The method of claim 7, wherein generating the attach attempt counter value is dependent on a level severity of the network failure such that the attach attempt counter value is generated as the minimum value in response the level of severity being most severe.

9. The method of claim 7, wherein generating the attach attempt counter value is dependent on the level severity of the network failure such that the attach attempt counter value is generated as 1 in response to the level of severity being least severe.

10. The method of claim 6 further comprising:
starting a T3450 timer in response to transmitting the attach accept message.

11. A user equipment (UE) comprising:
a transmitter and a receiver for transmitting and receiving data respectively;
a memory comprising an attach attempt counter that has a first attach attempt counter value; and
a processing circuit coupled to the transmitter and the receiver and the memory and is configured to:
transmit, via the transmitter, an attach request message;
receive; via the receiver, an attach reject message which contains a second attach attempt counter in response to transmitting the attach request message;
overwrite the attach attempt counter of the user equipment with the second attach attempt counter value;
determine whether to attach to the network according to the attach attempt counter which has the second attach attempt counter value;
not transmit another attach request message in response to the attach attempt counter which has the second attach attempt counter value being 0; and
transmit another attach request message in response to the attach attempt counter which has the second attach attempt counter value being greater than zero and less than a maximum number.

12. The UE of claim 11, wherein the processing circuit is further configured for in response to the attach attempt counter being zero or maximum which is five, the UE does not transmit through the transmitter another attach request message to the same network until the attach attempt counter is reset.

13. The UE of claim 12, wherein in response to the attach attempt counter being zero or 5, the user equipment attempts to attach to another network.

14. The UE of claim 13, wherein the processing circuit is further configured to increment the attach attempt counter in response to transmitting the another attach request message.

15. The UE of claim 14, wherein the processing circuit is further configured to start a T3410 timer in response to transmitting the attach request message; and to stop the T3410 timer in response to receiving attach reject message.

16. A network control entity comprising:
a transmitter and a receiver for transmitting and receiving data respectively; and
a processing circuit coupled to the transmitter and the receiver and is configured to:
receive an attach request message;
generate an overwriting attach attempt counter value for overwriting a current attach attempt counter value in response to a network failure, wherein the attach attempt counter value is between 1 and 4 for limiting a repetition of receiving the attach request message, and the attach attempt counter value is either a minimum number of a maximum number to stop receiving the attach request message;
generate an attach reject message comprising the overwriting attach attempt counter value and transmitting the attach reject message; and
transmit an attach accept message only in response to the network failure being resolved.

17. The network control entity of claim 16 wherein the minimum number of the overwriting attach attempt counter value is zero, and the maximum number of the overwriting attach attempt counter value is 5.

18. The network control entity of claim 17, wherein the processing circuit is further configured to generate the attach attempt counter value as being dependent on a level severity of the network failure such that the attach attempt counter value is generated as the minimum value in response to the level of severity being most severe.

19. The network control entity of claim 18, wherein the processing circuit is further configured to generate the attach attempt counter value as being dependent on the level severity of the network failure such that the attach attempt counter value is generated as 1 in response to the level of severity being least severe.

20. The network control entity of claim 19, wherein the processing circuit is further configured to start a T3450 timer in response to transmitting the attach accept message.

* * * * *